(12) United States Patent
Aguirre

(10) Patent No.: US 8,363,096 B1
(45) Date of Patent: Jan. 29, 2013

(54) METHOD AND APPARATUS FOR DISPLAYING STEREOSCOPIC 3D IMAGES WITH A LIQUID CRYSTAL PANEL

(75) Inventor: Sergio Aguirre, Monterrey (MX)

(73) Assignee: Echopixel Technologies, Inc., San Jose, CA (US)

( * ) Notice: Subject to any disclaimer, the term of this patent is extended or adjusted under 35 U.S.C. 154(b) by 959 days.

(21) Appl. No.: 12/195,378

(22) Filed: Aug. 20, 2008

Related U.S. Application Data

(60) Provisional application No. 60/956,991, filed on Aug. 21, 2007.

(51) Int. Cl.
*H04N 13/04* (2006.01)
(52) U.S. Cl. .................. 348/57; 348/42; 348/51
(58) Field of Classification Search .............. 348/42, 348/51, 57
See application file for complete search history.

(56) References Cited

U.S. PATENT DOCUMENTS

| | | | | |
|---|---|---|---|---|
| 5,976,017 | A * | 11/1999 | Omori et al. | 463/32 |
| 6,002,518 | A * | 12/1999 | Faris | 359/465 |
| 6,864,862 | B2 * | 3/2005 | Sato et al. | 345/32 |
| 2002/0158574 | A1 * | 10/2002 | Wolk et al. | 313/504 |
| 2011/0032346 | A1 * | 2/2011 | Kleinberger | 348/59 |
| 2011/0102562 | A1 * | 5/2011 | Johnson et al. | 348/58 |

OTHER PUBLICATIONS

Selig Hecht et al., "Intermittent Stimulation by Light: VI. Area and the Relation Between Critical Frequency and Intensity," J Gen Physiol., vol. 19(6), pp. 979-89, Jul. 20, 1936.
T.J. Andrews et al., "Temporal Events in Cyclopean Vision," Proc Natl Acad Sci U S A., vol. 93(8), pp. 3689-3692, Apr. 16, 1996.
David M. Hoffman, et al., "Temporal Presentation Protocols in Stereoscopic Displays: Flicker Visibility, Perceived Motion, and Perceived Depth," J Soc Inf Disp., vol. 19(3), pp. 255-273, Mar. 1, 2011.
Nicolas Holliman et al., "Three-Dimensional Displays: A Review and Applications Analysis," IEEE Transactions on Broadcasting, vol. 57, No. 2, suppl. 2, pp. 362-371, Jun. 2011.

* cited by examiner

*Primary Examiner* — Phuoc Nguyen

(57) ABSTRACT

A sample and hold display such as a Liquid Crystal Display (LCD) monitor that is capable of displaying video signals at a high frame rate, usually at over 120 frames per second, is described. The goal of the monitor is to enable the end user to view stereoscopic 3D images with the use of circular polarized glasses. The display switches between a left perspective view displayed with left handed circular polarization and a right perspective view displayed with right handed circular polarization as stereoscopic 3D images that are viewed with passive analyzing glasses. A horizontally segmented impulse backlight is used to control the timing of the images displayed in synchrony with a horizontally segmented liquid crystal modulator that performs the circular polarization. The impulse backlight and LC modulator eliminate crosstalk while maintaining brightness and high image contrast. Additionally, a unique driving scheme eliminates the appearance of individual segments.

18 Claims, 19 Drawing Sheets

T = 3

T = 4

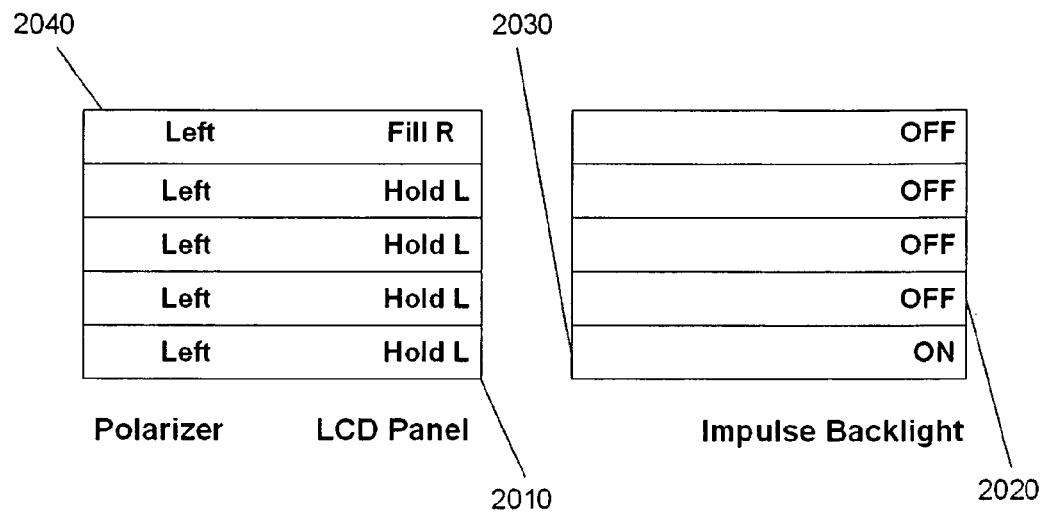
Fig. 20  T = 5
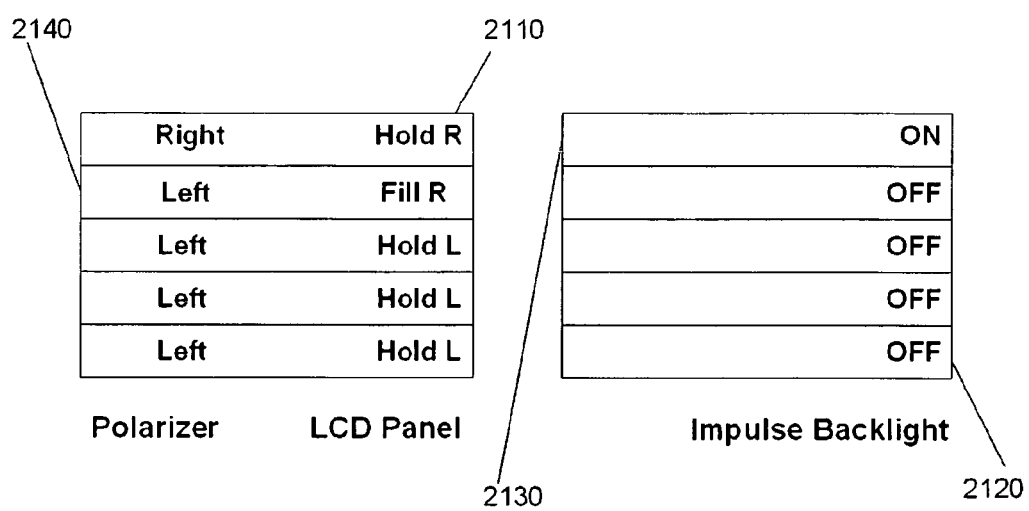
Fig. 21  T = 6

Left Eye View          Right Eye View

METHOD AND APPARATUS FOR DISPLAYING STEREOSCOPIC 3D IMAGES WITH A LIQUID CRYSTAL PANEL

RELATED APPLICATIONS

This application claims priority to U.S. Provisional Application 60/956,991, filed on Aug. 21, 2007, which is incorporated herein by reference.

FIELD OF THE INVENTION

The present invention relates to three-dimensional (3D) display devices and more particularly to devices that enable a user wearing polarized glasses to view stereoscopic 3D images on a single panel.

BACKGROUND

Electronic stereoscopic 3D visualization tools have been available since the early 1980's and have allowed the generation and display of stereo 3D images in computer equipment when displayed on CRT monitors. Using a combination of CRT monitors and liquid crystal shutter glasses (LC glasses), an end user is allowed to view a stereo 3D image by displaying a time sequential video stream on the CRT in sync with the LC glasses that only allow the user to view the left image with their corresponding left eye and the right image with the corresponding right eye.

This method of displaying stereo 3D images takes advantage of the fast impulse display properties of the CRT monitor. While the CRT monitor has served the PC industry well for over two decades and is known about to be fully replaced by flat screen technologies that allow lower power consumption and a truly digital display format to be exploited, mainly by LCD and Plasma monitors.

However the benefits of lower power consumption and digital formats do not have the same characteristics that a CRT presents for displaying Stereo 3D images. The main difference between a CRT and an LCD image display schemes is that the CRT displays a progressive raster scan that only has an image persistence of the phosphor being impacted by the electron beam. In other words each pixel of every image frame is only visible to the viewer for a few milliseconds (typically between 3 to 4 ms).

An LCD monitor on the other hand displays images on a sequential line by line basis, and because it is a digital device, the image pixel is displayed with a "sample and hold" approach. This means that it displays the information during the complete frame display time span.

Unfortunately for stereo 3D imaging, this sample and hold technique causes crosstalk because information belonging to the left eye is displayed while right eye image information is being refreshed and vice versa.

Another important factor to consider for stereo 3D visualization is display response time. A CRT because of the fast response time of a phosphor can display easily over 120 frames per second.

In the same manner, liquid crystal devices (say a single LCD pixel) can have fast turn on and turn off response times. But, because of how LCD monitors are addressed and controlled by their drive signals usually LCD monitors usually present very slow frame rates (up to only 60 frames per second). This causes significant flicker when attempting to view stereo 3D frame sequential images. To date, only a Stereo-Mirror display that uses two LCD panels is considered acceptable, with great reservations.

SUMMARY OF THE INVENTION

A sample and hold display such as a Liquid Crystal Display (LCD) monitor that is capable of displaying video signals at a high frame rate, usually at over 120 frames per second, is described. The goal of the monitor is to enable the end user to view stereoscopic 3D images with the use of circular polarized glasses. The display switches between a left perspective view displayed with left handed circular polarization and a right perspective view displayed with right handed circular polarization as stereoscopic 3D images that are viewed with passive analyzing glasses. A horizontally segmented impulse backlight is used to control the timing of the images displayed in synchrony with a horizontally segmented liquid crystal modulator that performs the circular polarization. The impulse backlight and LC modulator eliminate crosstalk while maintaining brightness and high image contrast. Additionally, a unique driving scheme eliminates the appearance of individual segments.

BRIEF DESCRIPTION OF THE DRAWINGS

FIG. 20 illustrates a display timeline in an embodiment of the present invention.

FIG. 21 illustrates a display timeline in an embodiment of the present invention.

DETAILED DESCRIPTION

Video Signal

A personal computer can be efficient at rendering sequential stereoscopic images.

Figure 1:
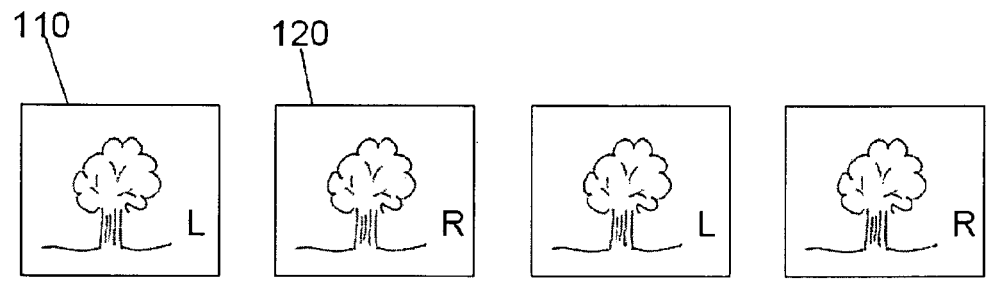
FIG. 1 illustrates a sequence of left and right images.

Left and right perspective images can be output alternately (sequentially) on the same video channel (VGA or DVI port). In FIG. 1, a sequential video feed is illustrated where a tree labeled "L", 110; is the left image perspective view and the one labeled "R", 120; the right image perspective view.

This method is more commonly known as 'field sequential' or 'frame-sequential' because it is a sequence of fields or frames. It is described here generically as 'time-sequential' because it is a time sequential sequence of left and right perspective images (which can either be frames or fields).

Time-sequential stereoscopic image quality is dependent upon the persistence and refresh rate of the display and also the quality of the particular glasses used. Shorter persistence pixels and faster refresh rates produce better time sequential stereoscopic image quality. Other 3D image quality factors in time-sequential 3D are ghosting and flicker.

In order for the frame-sequential stereoscopic viewing method to work on a particular display device, the display must be capable of displaying separate and discrete alternate images without noticeable crosstalk between images, and at a sufficiently high image update frequency to avoid visible flicker. This means that the higher the frames per second, the better stereo 3D effect that the end user experiences.

In order to minimize crosstalk and flicker, in one embodiment it is recommended that the input video stream to the display device have the following characteristics: Resolution: 1280 by 720 pixels or higher; Frames per second: 120 (60 right images and 60 left images) or higher; First Image: Left.

The video signal described is sometimes known in computer graphics literature as "page-flipping" and is documented in the context of double-buffered animation. That is, while one video page is being displayed, the next image is drawn to a second non-visible video page.

For stereoscopic displays, this concept can be exploited to produce alternating left and right images which have already been rendered. For producing smooth animation sequences, the stereo version of double-buffering is extended to become quad-buffering.

Figure 2:
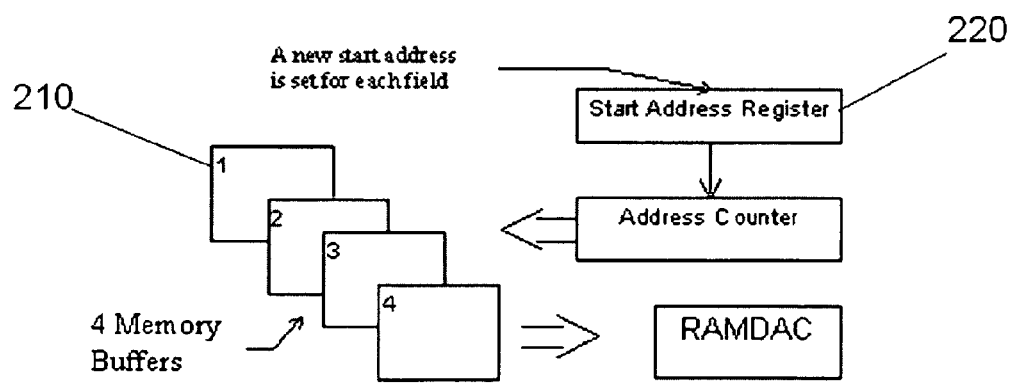
FIG. 2 illustrates memory buffering in a display device.

As shown in FIG. 2, the memory available to the graphics system is divided into four buffers, 210. One pair of buffers is the 'display pair' and the other is the 'rendering pair.' The display starts at the beginning of one of the display buffers. When the end of the buffer is reached (at the bottom of the screen) the display controller continues but uses the other display buffer the next time through. Thus the screen alternates between the contents of first one buffer and then the other.

While the display buffers are alternating once per frame, the other pair of buffers is available to receive the next pair of images. These can be either rendered directly into the video memory or rendered into system memory and then transferred when complete. After an updated image pair is completed, the display continues with the new buffer pair, releasing the former display buffer pair to receive the next pair of images. The best implementations of page flipping include hardware that is able to automatically manage the display buffers. Instead of allocating one register for use as a start address, the hardware must allocate two registers, 220. These registers are linked to a flip-flop that toggles at the leading edge of vertical sync. Thus the display data alternates every other field in sync with a logic signal.

Displaying Stereo 3D Images

A stereo 3D display presents images to the viewer, both left and right perspective views on single display screen. It is thus important to determine how to place them on a single video display screen in order to have an optimum stereo 3D effect on the end user.

Figure 3:
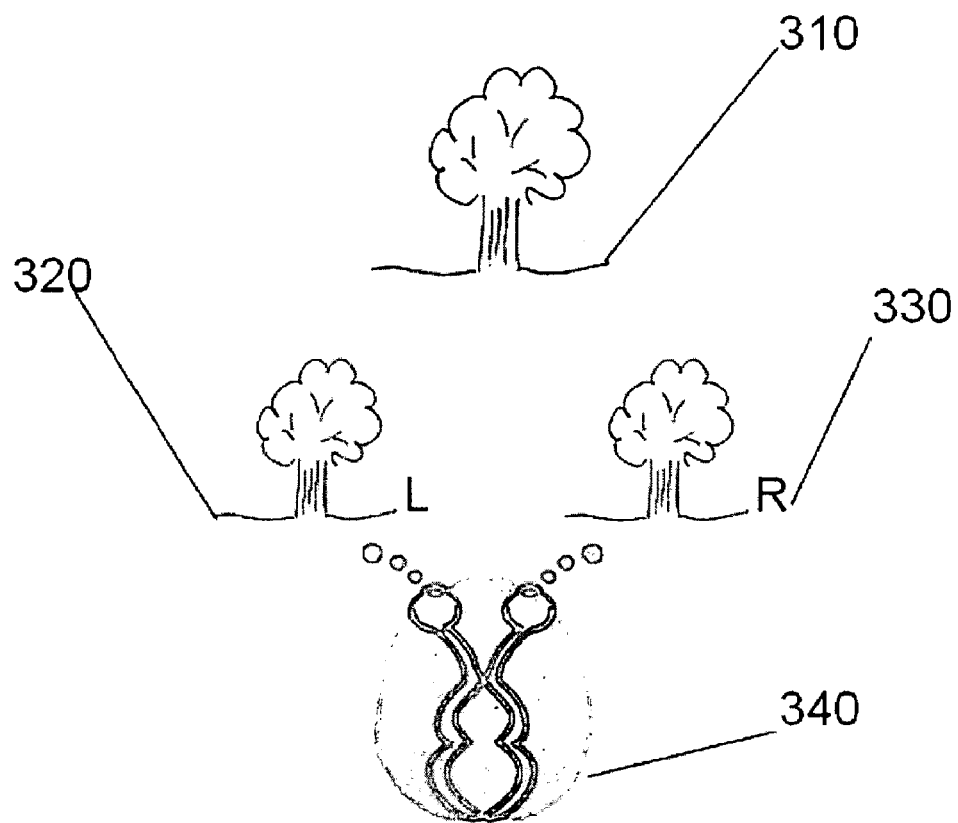
FIG. 3 illustrates left and right perspective views of a scene.

Taking into account that a stereo 3D video signal is comprised of a sequence of image frames that are sequentially separated; we can determine that a video image stream is a sequence of left and right perspective views of a 3D object such as depicted in FIG. 3 in a screen, 310. As the images are displayed the LC modulator is synchronized to polarize light in right and left handed circular polarization schemes.

This stereo 3D video signal is a sequence of left and right perspective views that when displayed as polarized light only require that the observer use special polarized glasses to perceive the stereo 3D effect.

When the left perspective view is being displayed on the screen, 320; the liquid crystal modulator polarizes the light as left handed circular polarized light and thus is blocked from the right eye from seeing and allows only the corresponding left eye to capture the image.

Afterwards when the right perspective view, 330, is being displayed on the screen liquid crystal modulator polarizes the light as right handed circular polarized light and thus is blocked from the left eye from seeing and allows only the corresponding right eye to capture the image. Thus, the brain is able to fuse the perspective views into a single stereo 3D image, 340.

Stereo 3D Ready LCD Monitor

Figure 4:
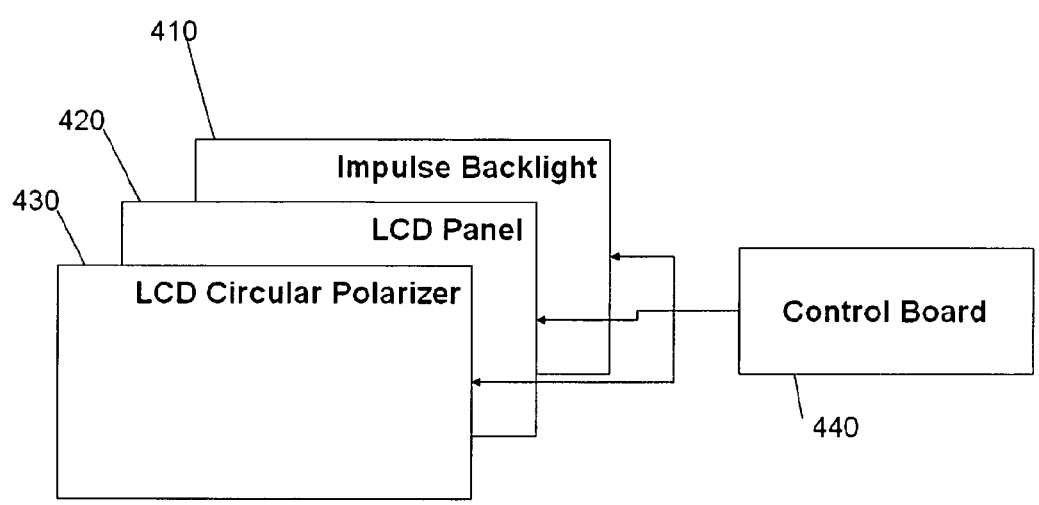
FIG. 4 illustrates components of an embodiment of the present invention.

FIG. 4 illustrates an embodiment of the present invention as a stereo 3D ready LCD display device comprised of the following components: a impulse backlight, 410; an LCD panel, 420; a Liquid Crystal (LC) modulator, 430; and a Control Board, 440.

Figure 5:
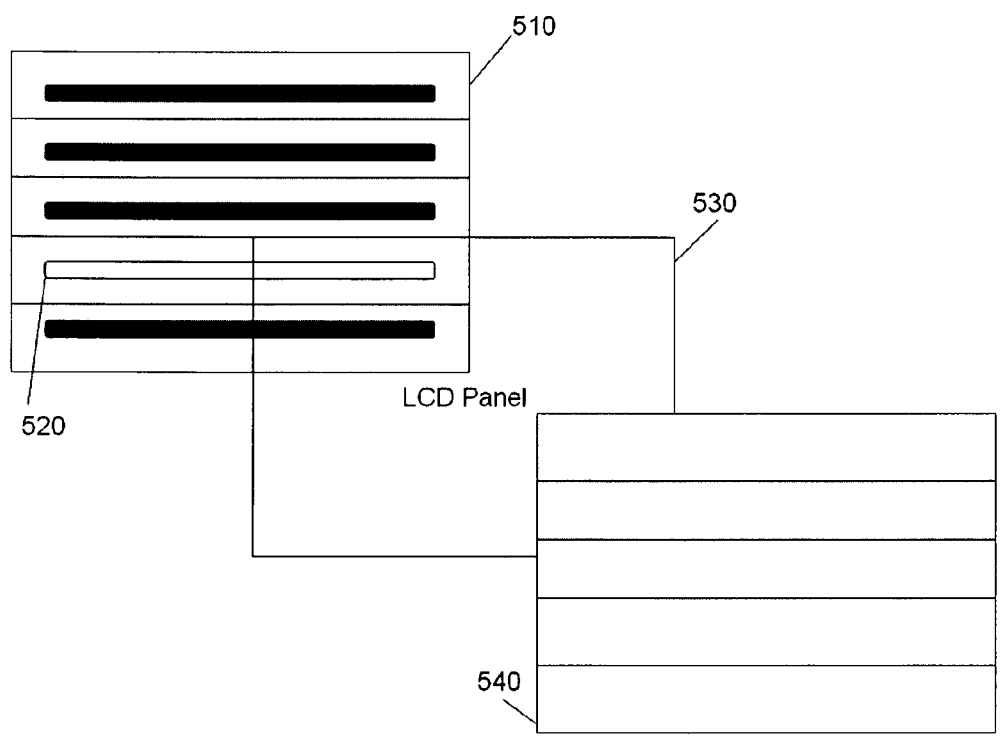
FIG. 5 illustrates components of an embodiment of the present invention.

As illustrated in FIG. 5, the impulse backlight 510, consists of 5 horizontal backlight sources, 520 that can be triggered independently. In front of the backlight there is a fast response LCD panel 530 that is addressable as 5 horizontal segments by means of a video control board. And finally, in front of the LCD panel a 5 segment LC modulator 540 that spins the linearly polarized light coming out of the LCD panel into either right or left handed circular polarization. In alternative embodiments, the segmentation of the display can be horizontal or vertical or a combination of both.

The three main elements that comprise the LCD display device are controlled by the video control board 440 and in particular by an internal timing and synchrony control system that allows displaying a full horizontal segment of the LCD panel as its corresponding impulse backlight is triggered and modulated by the LC circular polarization modulator.

Because an LCD monitor is a "display and hold" device, even the fastest response LCD panels will not display an optimum stereo 3D image. This display and hold strategy of progressively refreshing each image line on the LCD panel causes that at all times there be left and right image information present, causing crosstalk.

If there were a way of displaying full frames and blanking the image at high frame per second rates (i.e., 90 or 120 images per second) directly then this would be the most direct approach to implement a stereo 3D LCD monitor.

However, the present invention involves a new LCD panel update strategy. The control system of the video controller allows the display of the correct image information in the most efficient way for stereo 3D visualization with current LCD panel technology.

The following conditions are met for each image section in order to display a time sequential stereo 3D video signal:

1. the image section pixels are written on the LCD panel during a preliminary data address cycle;
2. the image section pixels written during the data address cycle are not to be displayed until given enough time to respond;
3. the panel section that has just been filled with its corresponding image section pixels is illuminated only for a short period of time.

These conditions help to maximize the effects that the display strategy seeks to implement, and allow for time sequential stereo 3D display.

In the following sections we describe in detail how each of the elements that comprise the stereo 3D ready LCD monitor allow for maintaining CRT display properties on an LCD panel.

Impulse Backlight

Figure 6:
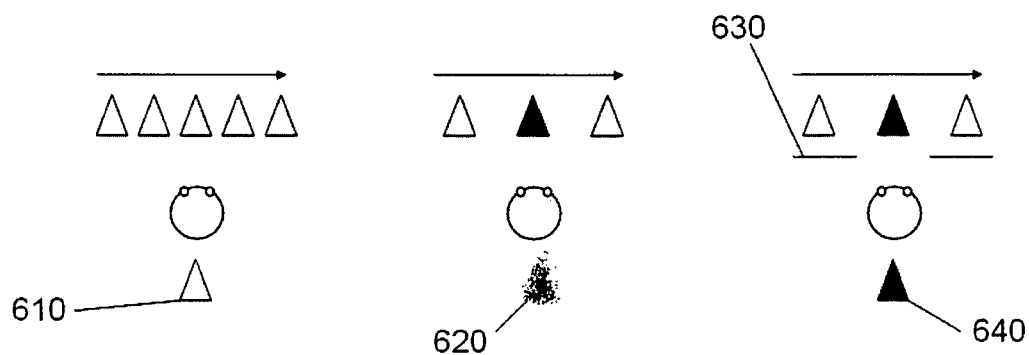
FIG. 6 illustrates the operation of an impulse backlight.

FIG. 6 illustrates that slow LCD panel response rate and slow frames per second display has an adverse effect on motion sharpness, in other words we are capable of seeing an object in movement as a sharp image, 610. One of the strategies proposed for solving the persistence of motion blur 620 on LCD panels is with the use of impulse backlight, 630. This enables the video controller to have control of the time it takes to turn on/off the LCD pixels. When the backlight is turned ON over a particular image section, those pixels will be visible and a sharp image 640. But when the backlight is turned OFF they will not, since they are displayed and blocked or darkened.

Thus, instead of doing a progressive line image scan it is more desirable to display image frame sections that can be controlled by the impulse backlight and turned on or off, simulating a CRT scan and phosphor response.

In other words, the impulse backlight allows us to eliminate the "sample and hold" display strategy of traditional LCD panels, and give way to a time controlled display of image sections within the display screen.

Figure 7:
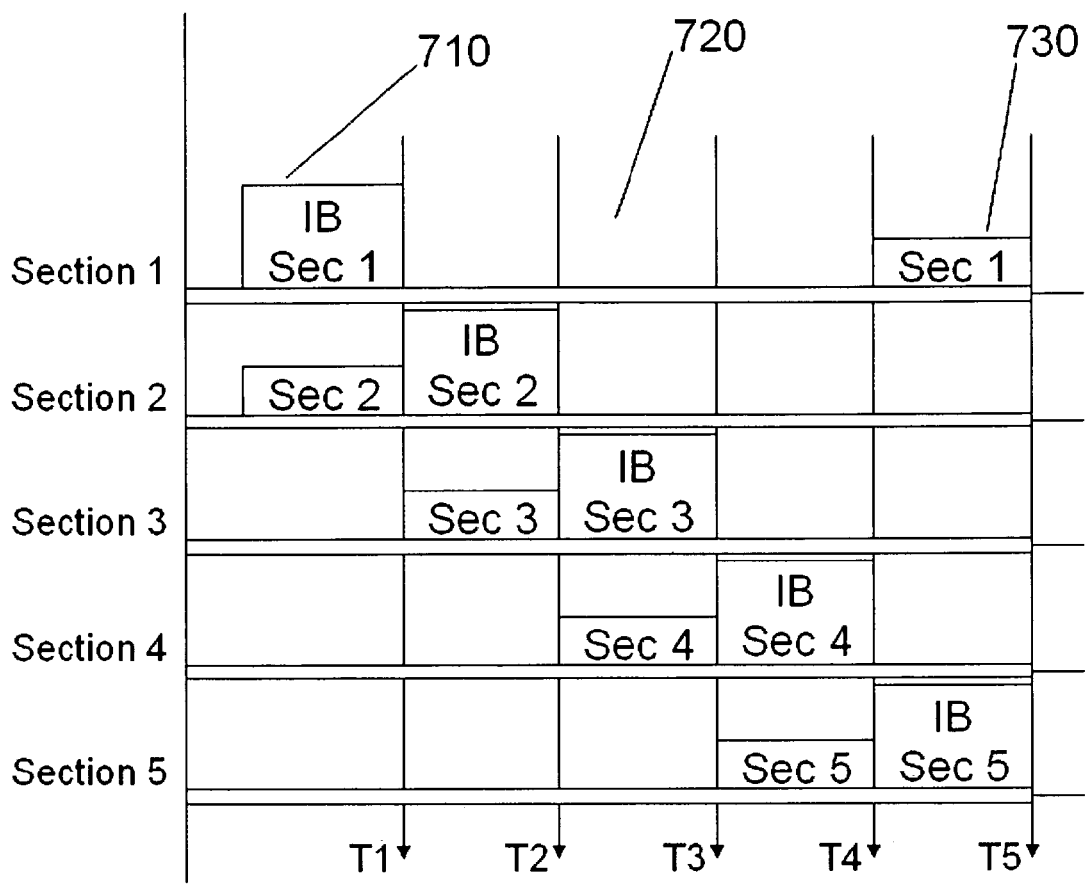
FIG. 7 illustrates a timing diagram for an impulse backlight.

Triggering a backlight section from a completely off state to an on state can take some additional time and consume significant energy as illustrated in FIG. 7. So, when the backlight is placed in the ON state labeled as "IB" for each corresponding image section 710, its light intensity is at 100%, but when it is in the OFF state it will shine at 10% to 40% light intensity 720. In order to do this correctly the data to be displayed must be transferred before the impulse backlight is to be turned on 730.

This causes the LCD panel pixels to "dim" significantly in contrast to the ones that are being shined on the screen at a particular moment. This "dim" will still show some light leakage onto the screen but this shall be addressed by the LC modulator in a following section.

LCD Panel

An LCD panel consists of a large array of small liquid crystal cells that are switched ON or OFF depending of the intensity and color that it must display. As any device, it has a turn ON response time and a turn OFF response time.

Figure 8:
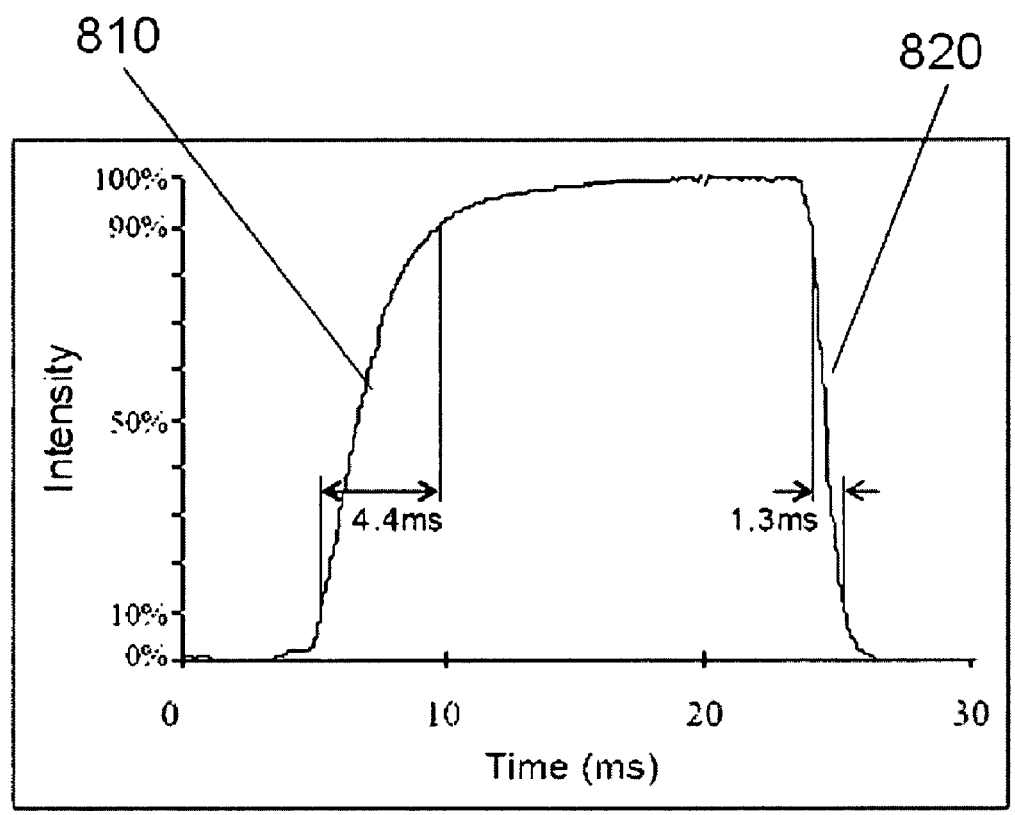
FIG. 8 illustrates the response of liquid crystal cells.

In the case of LC cells as depicted in FIG. 8, a turn ON 810 time is the equivalent of changing one pixel from black to white (BTW) and turn OFF 820 is the equivalent of changing a pixel from white to black (WTB). Since current LCD panels a WTB average time is around 1.3 milliseconds and a BTW average time is around 4.4 milliseconds, it is important to review how to have a much faster BTW time. Even these current fast response times would not be enough to correctly display a stereo 3D image.

However, several LCD panels with a 2 millisecond Gray to Gray (GTG) response time are now available in the market. It has been observed that a GTG response time would not be sufficient for displaying stereo 3D images based on the expectation that high contrast areas would generate crosstalk since a BTW response time is much longer.

But the present invention shows that several stereo 3D visualization applications can benefit form the fast GTG response time and display a good stereo 3D effect. The reason for this is because in the present invention a pixel cell will actually be controlled by the impulse backlight and the LC modulator. This means that because we can control the time that the pixel cell displays light we can also control the time it does not shine light and thus give it enough time to transition to its new value.

Figure 9:
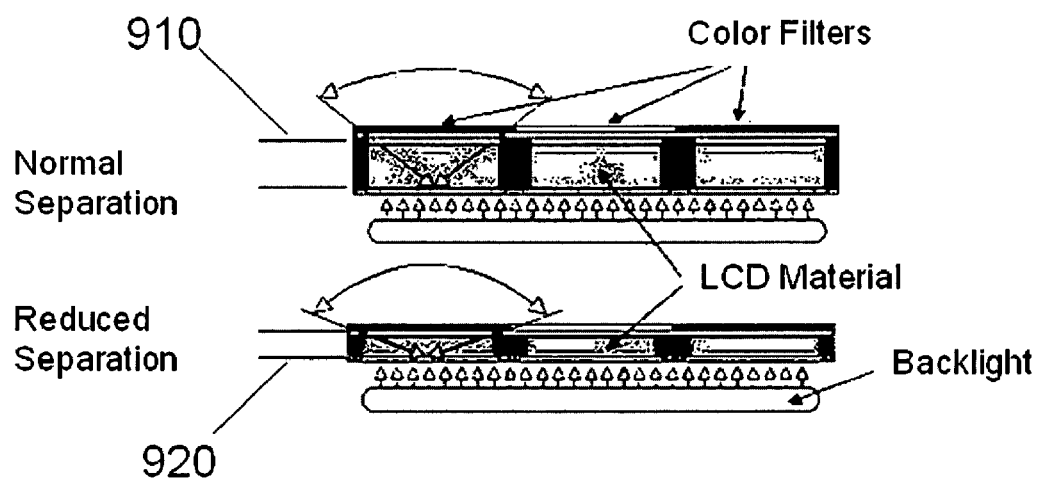
FIG. 9 illustrates a cross-section of a liquid crystal display.

In FIG. 9 we show additional factors that are involved in the response time of an LC cell, one of them is the thickness of the LCD panel. Basically, the thicker the panel 910, the more liquid crystal material one must move and hence the longer it takes. A simple way of speeding up the response time is to build a slimmer LCD panel 920. Several models are available that are at least 30% thinner than standard issue LCD panels.

Figure 10:
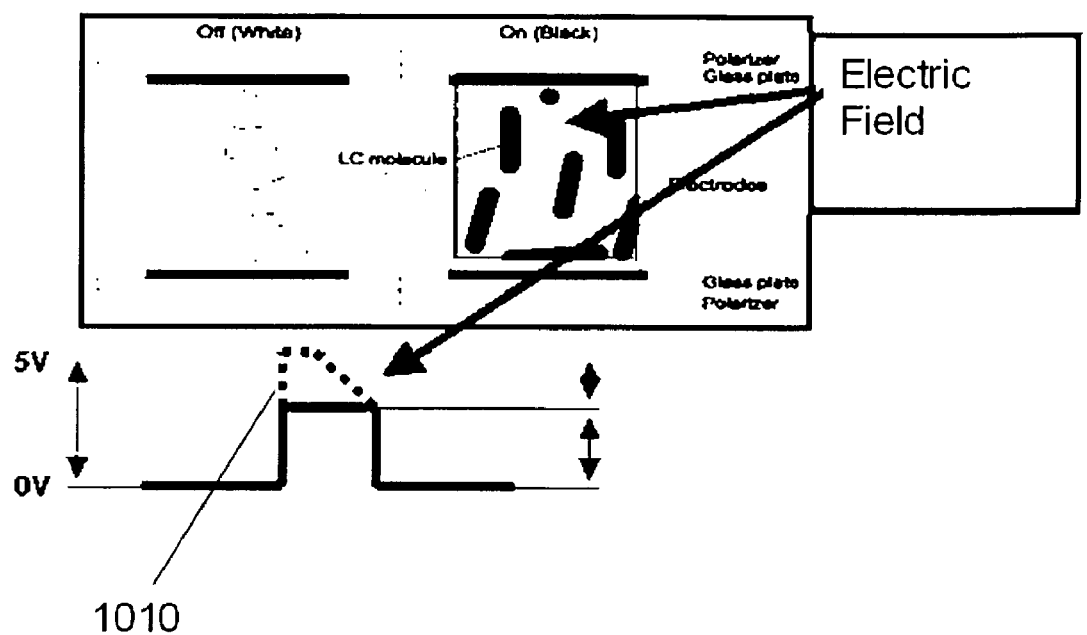
FIG. 10 illustrates a liquid crystal drive signal.

FIG. 10 illustrates a second and easier to implement technique that can be done to speed up the LC cell response, which is to have an impulse voltage signal drive the cell, 1010. In other words, the drive signal that activates the LC cell must apply a much larger bias voltage in order to speed up response. This technique has been used by Viewsonic to achieve a BTW response of on the order of 1 to 2 milliseconds. In this case, for instance if the recommended nominal drive voltage is a 3 V signal, the LC cell can be driven faster by applying a 5 V drive signal.

Finally, the standard strategy for updating an LCD panel is a progressive line per line approach, where each line maintains its display value until a full frame time has passed.

In an embodiment of the present invention we drive the display light from an impulse backlight and so we synchronize the data to be displayed on the LCD panel to the impulse backlight. In this sense, a new addressing and update approach is used.

We begin by first segmenting the LCD panel into five image sections that will be updated in synchronization with the backlight. Thus, before image section 1 is illuminated by the back light it is fully updated and all pixels should have a full response of the image to display.

For this, the video controller updates several dozen image lines at the same time so that in around 3 milliseconds the first image section is ready to be displayed on screen. As section 1 is being displayed, section 2 is being updated and given time to respond. Then as image section 2 is displayed by the impulse backlight, section 3 is updated and so forth. For example if the LCD panel resolution is 800 by 600 pixels, each image section would be equal to 120 image lines that must be updated at the same time.

LC Modulator

As the impulse backlight allows the LCD panel to shine its corresponding horizontal image section, the LCD panel is linearly polarizing the light that goes through it.

Figure 11:
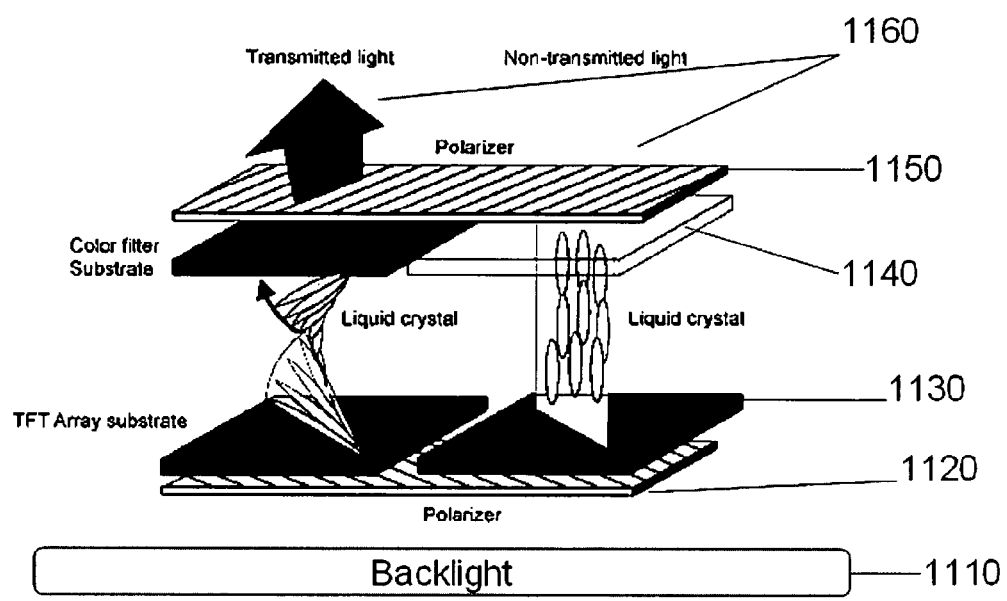
FIG. 11 illustrates a liquid crystal display monitor.

Modern LCD monitors as depicted in FIG. 11 are built using a backlight 1110, a polarizer sheet 1120, an LCD panel 1130, color filter sheet 1140 and a final polarizer 1150 sheet aligned orthogonally to the initial polarizer. This means that all light coming out of the LCD panel is aligned by the orientation defined by the last polarizer. This is usually a linear polarizer at a 45 or 135 degree angle 1160.

Because the LCD display device of the present invention uses a standard fast response LCD panel in one embodiment, we must add a corresponding horizontal LC polarization modulator. The goal of this modulator is to spin the outgoing horizontal segment light being shined by the impulse backlight and linearly polarized by the LCD panel into right and left handed circular polarized light.

Figure 12:
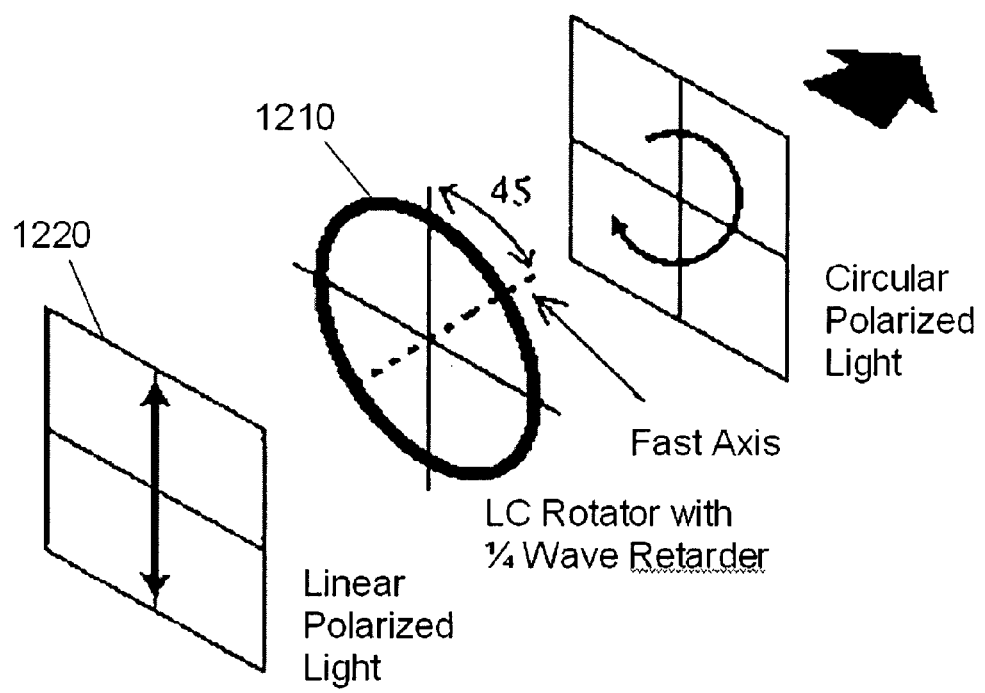
FIG. 12 illustrates a liquid crystal modulator.

As shown in FIG. 12, the LC modulator consists of an LCD device that will have a quarter (¼) wave retarder 1210. The modulator should be aligned with the LCD panel so as to have the outgoing linearly polarized light 1220 go through the liquid crystal section and then through the quarter wave retarder.

This means that it must have its side of LCD attached to the last polarizer sheet of the LCD monitor and the quarter wave retarder should be the final element of the complete stereo 3D LCD monitor.

The function of the rotator is to circularly polarize each left and right perspective view being shown in the monitor. In the end, the end user will use circularly polarized glasses to analyze the stereo 3D image.

As with the impulse backlight and the LCD panel, in order for the LC Modulator serve its purpose, it is first considered as a device comprised of a group of image sections driven by special drive signals in sync with the display image.

In one embodiment, the LC Modulator is comprised of five groups of liquid crystal cells (commonly known as π-cell) that need to be controlled by an AC voltage signal in order to attain the desired left or right handed synched polarization. However a multiple segment modulator has a drawback: the segments are noticeable as individual units, especially when the image contains light colored neutral backgrounds.

This visible border is not caused by the indium tin oxide coating that is a conducting surface to activate the LC cell, it is caused by the shading, density and coloring present in LC cells at their boundary line between each segment. For stereo 3D purposes, this is a very distracting artifact.

By appropriately driving the LC cells we can eliminate the segment artifact and have an optical effect of a single cell polarization rotator even though the image is illuminated, displayed and polarized per section.

A way of homogenizing the shade, density and coloring of an LC cell is by applying a bias voltage that will activate the cells into a state where they are beginning to align to the electrical field applied to them but not enough for the cell to completely switch into a fully aligned state.

Figure 13:
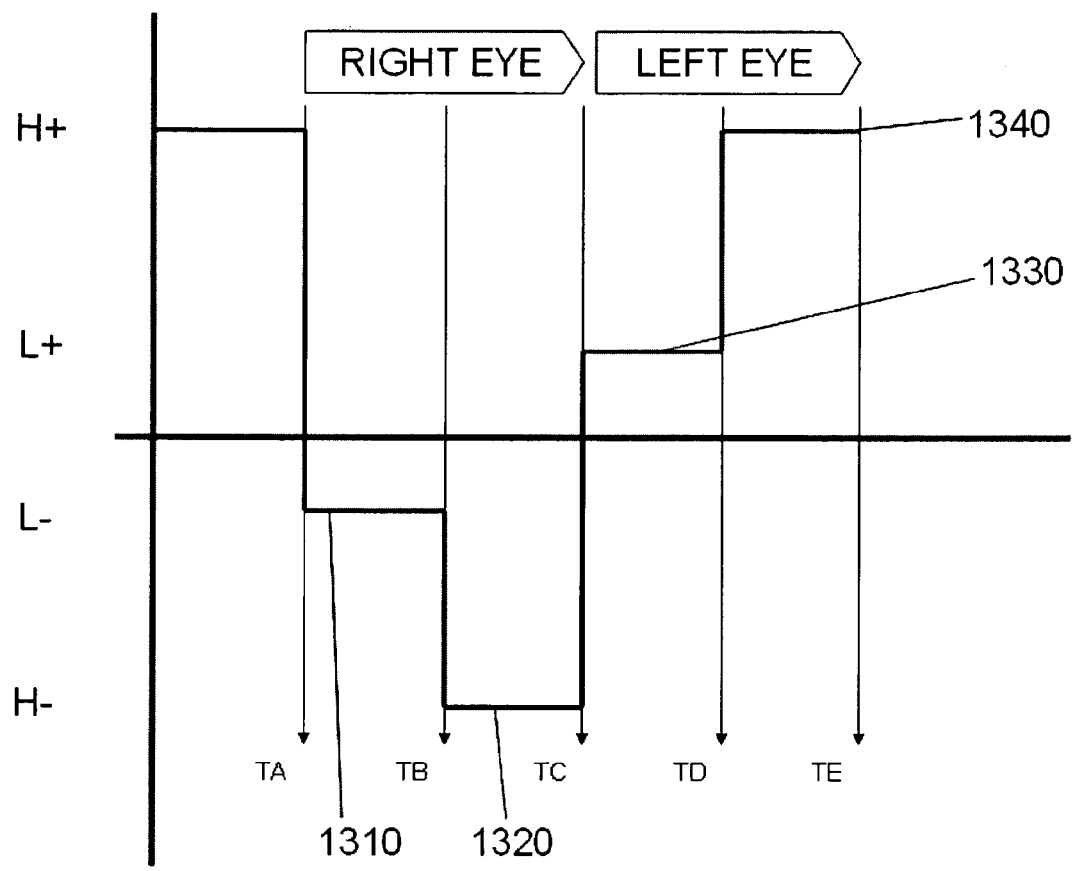
FIG. 13 illustrates a timing diagram for a liquid crystal modulator.

In order to do this, as illustrated in FIG. 13, instead of only driving each cell with an AC signal with a zero volts direct current component (0V DC), each LC cell be driven on each half cycle of its drive signal with a small DC component.

If we consider that the LC modulator drive signal has four sections, then the first quarter cycle must have a −L 1310 voltage in order to help the second quarter cycle have a fast response for the −H 1320 voltage and polarize the light going through it as right handed polarized light. In the same manner, the third quarter cycle now has a +L 1330 voltage and the fourth cycle will have a +H 1340 voltage in order to generate left handed polarized light. Thus, the −L and +L voltage levels allow for a sharper image when viewing stereo 3D. In alternative embodiments, multiple voltage levels within each polarity may not be needed, as long as there is a voltage polarity change of sufficient amplitude between eyes.

When applying this to the segmented LC cells in the stereo 3D ready monitor, we must now determine that each cell must operate in synchrony with the impulse backlight and the information written to the LCD panel. And additionally help the user see the image section we desire and the impulse backlight block the sections it is trying to block.

Figure 14:
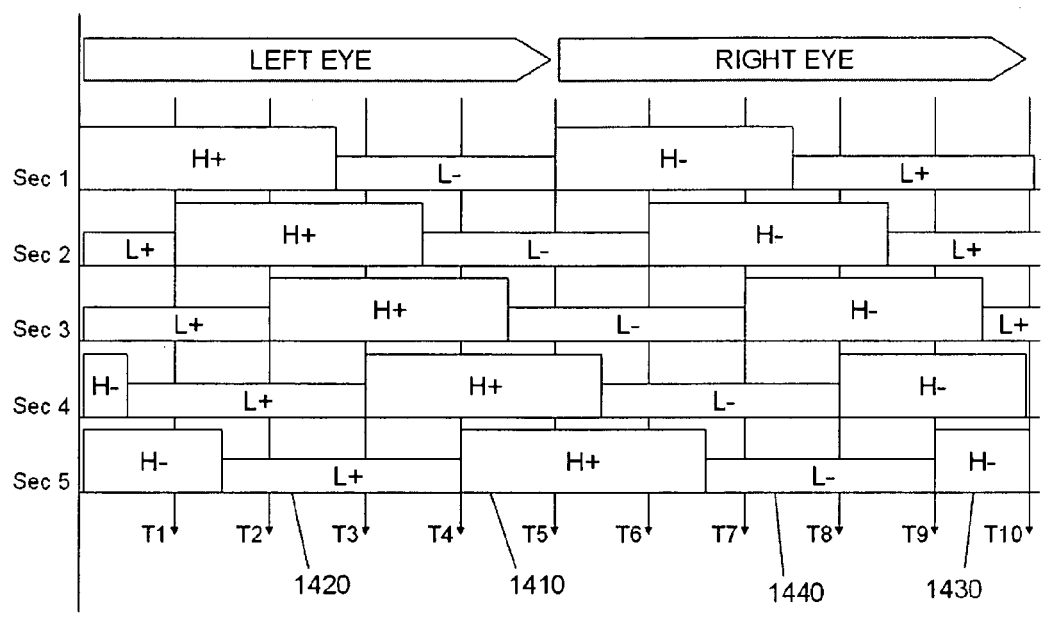
FIG. 14 illustrates a timing diagram for a liquid crystal modulator.

A way of doing this is by triggering each LC modulator segment in synch with the impulse backlight of the corresponding image section, as in FIG. 14.

This means that all H+ 1410, L+ 1420, H− 1430 and L− 1440 voltages and the four stages described before for the drive signal must be aligned with the corresponding impulse backlight timing. This will only result in having a slight phase out of each LC segment by 1 image section.

When a section is loading new data, the polarizer can be set to the same eye spin as the data that is being loaded, so that leakage light will allow the user to see the correct eye perspective for the new data. In alternative embodiments, it is also possible to adjust the timing so that the polarizer maintains its previous polarization during loading, and is switched to the new perspective when the back light turns on. In further alternative embodiments, the polarizer may be switched during loading of new data.

Display Timeline

Figure 15:
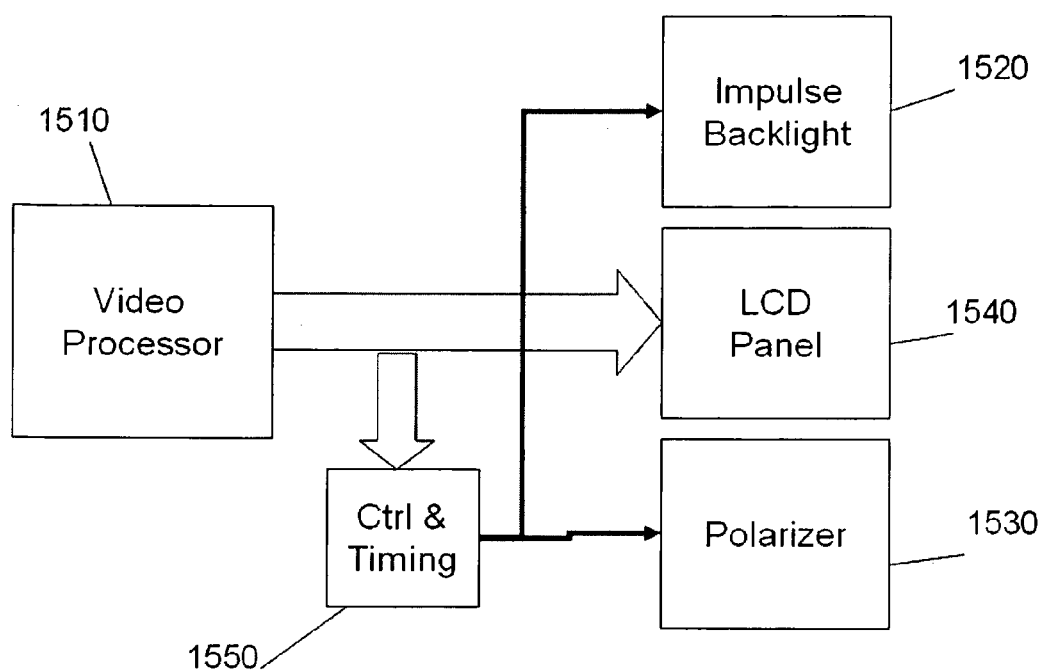
FIG. 15 illustrates components of an embodiment of the present invention.

The video processor and the synchrony control system (labeled "Ctrl & Timing" in FIG. 15) are responsible for the proper update of the LCD panel segments and the corresponding trigger of backlight and LC modulator segments.

The video processor 1510 does not modify the sequence of frames that the video signal has time sequentially coded in it. So movement interpolation algorithms or artificial line padding are typically not compatible with stereo 3D visualization. As long as the left and right image perspective views are maintained in sequential order and timing, then the stereoscopic 3D display effect can be maintained.

The impulse backlight 1520 and LC modulator 1530 will be triggered by the number of lines that are refreshed on the LCD panel 1540 in order to display the corresponding horizontal image section. These impulse and modulator trigger signals will be one segment behind the current line refresh fill of the LCD panel. This is easily maintained by a phase locked loop circuit 1550.

The display pipeline shall always present a left image followed by a right image sequentially. When displaying the stereo 3D video signal on the LCD panel we begin by first displaying the left image perspective view.

Figure 16:
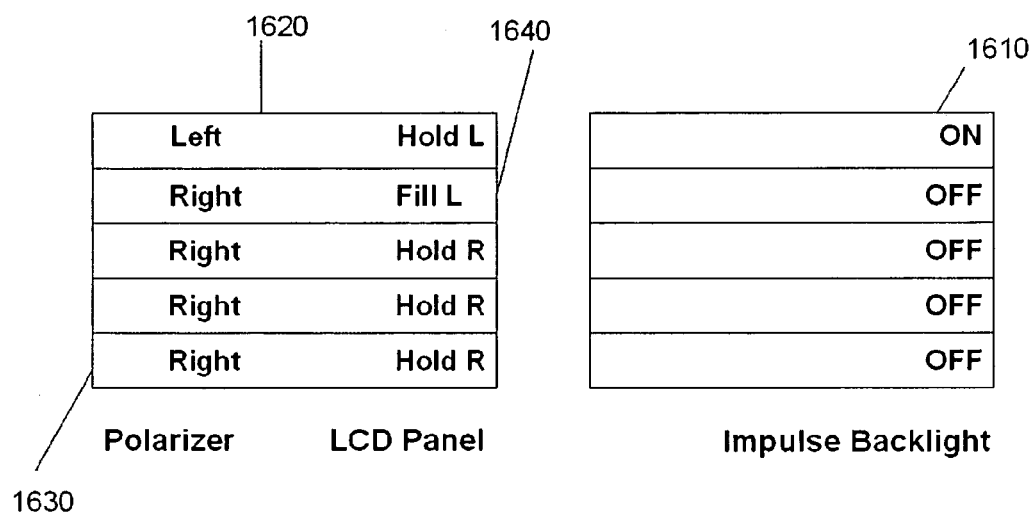
FIG. 16 illustrates a display timeline in an embodiment of the present invention.

During Time Period 1, illustrated in FIG. 16, we assume that the corresponding backlight segment of section 1 is ON 1610 and the rest are OFF, also that section 1 1620 is fully updated with its corresponding left image perspective view lines and being modulated with left handed circular polarization. The rest of the LCD panel sections are filled with information of the previous right image perspective view 1630, but are not visible to the end user because the corresponding impulse backlight segments are turned off and the LC modulator sections are polarizing the image sections with right handed circular polarization. In other words, not only is no light being shined through the LCD panel, but any leakage light is being blocked as right handed circular polarized light from the left eye of the end user.

Also as section 1 is being shined on the screen, section 2 1640 is being filled or updated with its corresponding left image perspective view lines under the cloak of a turned off backlight segment and a right handed circular polarization.

Figure 17:
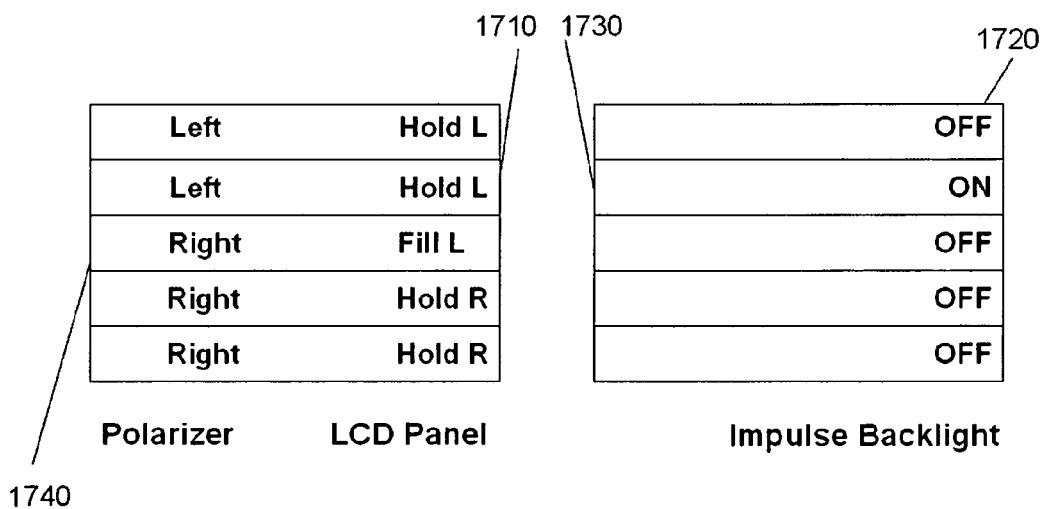
FIG. 17 illustrates a display timeline in an embodiment of the present invention.

During Time Period 2, illustrated in FIG. 17, once section 2 1710 has been filled and a separation time has elapsed (t-sep) to make sure that all of section has been updated, section 1 1720 is blocked from the screen by turning off the corresponding impulse backlight but keeping the LC modulator of section 1 in a left handed polarization state since the left image perspective view frame is being written to the LCD panel.

At the same time, section 2 backlight 1730 is turned on and its corresponding LC modulator section is turned to the left handed circular polarization state.

This way only section 2 is visible to the left eye of the end user wearing the polarized glasses.

As section 2 is being shined on the screen, section 3 1740 is being filled or updated with its corresponding left image perspective view lines under the cloak of a turned off backlight segment and a right handed circular polarization.

Figure 18:
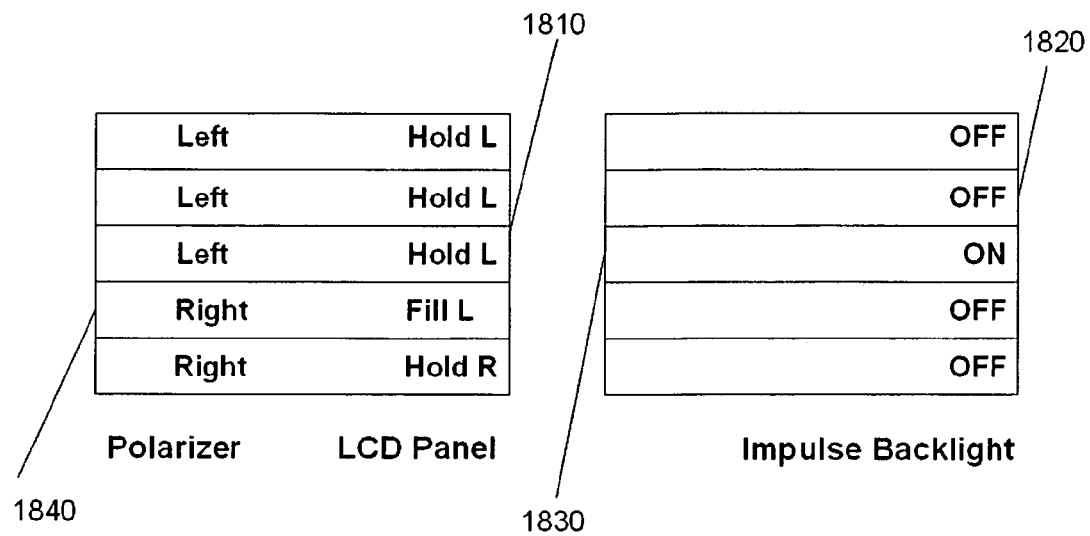
FIG. 18 illustrates a display timeline in an embodiment of the present invention.

During Time Period 3, illustrated in FIG. 18, once section 3 1810 has been filled and a separation time has elapsed (t-sep) to make sure that all of section has been updated, section 2 1820 is blocked from the screen by turning off the corresponding impulse backlight but keeping the LC modulator of section 2 in a left handed polarization state since the left image perspective view frame is being written to the LCD panel.

At the same time, section 3 1830 backlight is turned on and its corresponding LC modulator section is turned to the left handed circular polarization state.

As section 3 is being shined on the screen, section 4 1840 is being filled or updated with its corresponding left image perspective view lines under the cloak of a turned off backlight segment and a right handed circular polarization.

Figure 19:
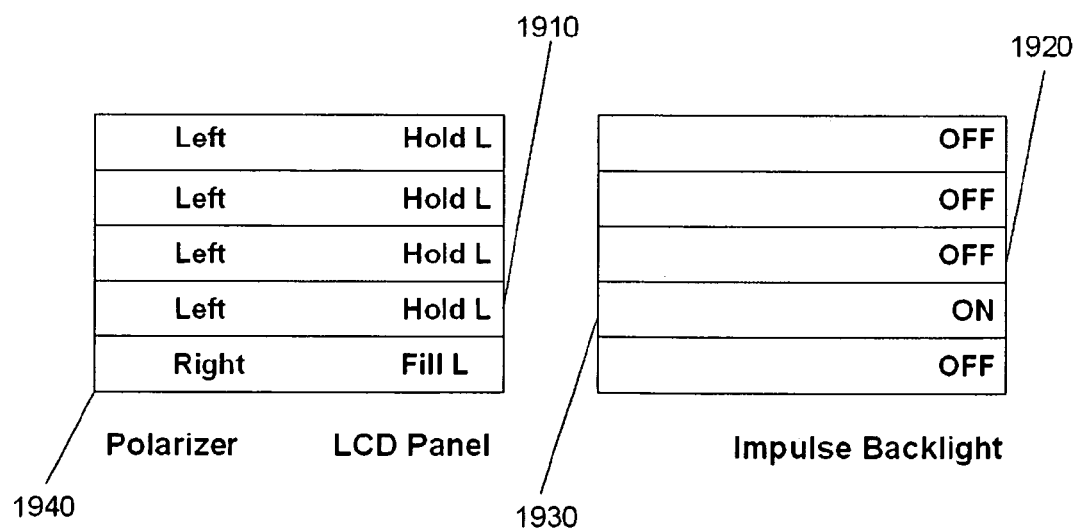
FIG. 19 illustrates a display timeline in an embodiment of the present invention.

During Time Period 4, illustrated in FIG. 19, once section 4 1910 has been filled and a separation time has elapsed (t-sep) to make sure that all of section has been updated, section 3 1920 is blocked from the screen by turning off the corresponding impulse backlight but keeping the LC modulator of section 3 in a left handed polarization state since the left image perspective view frame is being written to the LCD panel.

At the same time, section 4 1930 backlight is turned on and its corresponding LC modulator section is turned to the left handed circular polarization state.

As section 4 is being shined on the screen, section 5 1940 is being filled or updated with its corresponding left image perspective view lines under the cloak of a turned off backlight segment and a right handed circular polarization.

During Time Period 5, illustrated in FIG. 20, once section 5 2010 has been filled and a separation time has elapsed (t-sep) to make sure that all of section has been updated, section 4 2020 is blocked from the screen by turning off the corresponding impulse backlight but keeping the LC modulator of section 4 in a left handed polarization state since the left image perspective view frame is being written to the LCD panel.

At the same time, section 5 2030 backlight is turned on and its corresponding LC modulator section is turned to the left handed circular polarization state.

As section 5 is being shined on the screen, section 1 2040 is being filled or updated with its corresponding right image perspective view lines under the cloak of a turned off backlight segment and a left handed circular polarization.

During Time Period 6, illustrated in FIG. 21, once section 1 2110 has been filled and a separation time has elapsed (t-sep) to make sure that all of section has been updated, section 5 2120 is blocked from the screen by turning off the corresponding impulse backlight but keeping the LC modulator of section 5 in a left handed polarization state since the left image perspective view frame has just been completely written to the LCD panel.

At the same time, section 1 backlight 2130 is turned on and its corresponding LC modulator section is turned to the left handed circular polarization state.

As section 1 is being shined on the screen, section 2 2140 is being filled or updated with its corresponding right image perspective view lines under the cloak of a turned off backlight segment and a left handed circular polarization.

Because both impulse backlight and LC modulator work together in displaying and blocking the corresponding image sections to the end user it would outperform today's CRT based stereo 3D display systems offering enhanced brightness, enhanced extinction ratio, and no flicker.

A particular application that would directly benefit from a stereo 3D ready LCD monitor is the field of medical visualization. In particular a colonoscopy imaging system that would allow doctors to better detects pre-cancerous and cancerous polyps.

Figure 22:
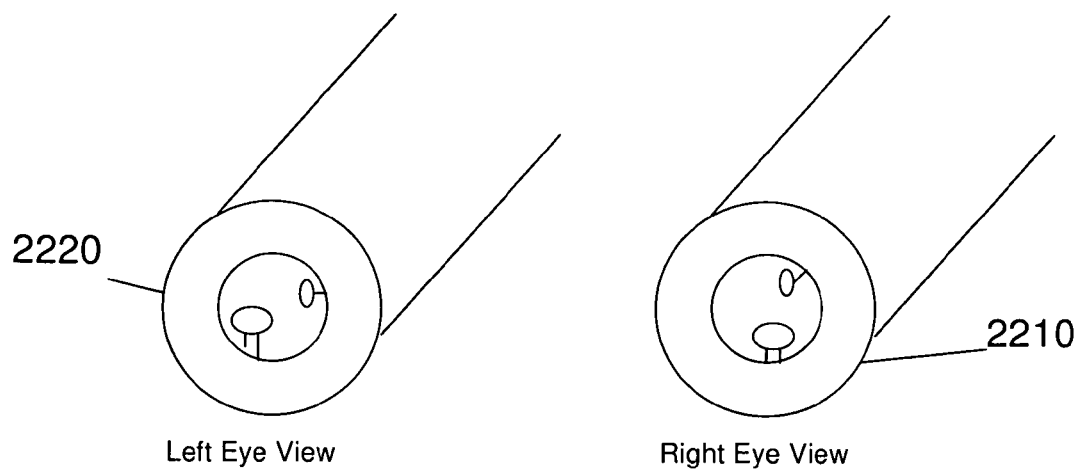
FIG. 22 illustrates an application of the present invention to medical imaging.

Medical visualization is a complex task to perform because of the complicated shape and form of human tissue anatomy. Additionally, medical visualization images tend to be low contrast images because of the homogenous nature of the image that usually looks at small sections of the same organ or tissue. When viewing colon images as depicted FIG. 22 the image perspective views right 2210 and left 2220 tend to have the same color and brightness in most of the image pixels. This allows us to take advantage of the GTG response time.

In one embodiment, the monitor would have a resolution of 1280 pixels wide by 720 pixels tall. In order to have a flicker free image on screen the video signal would be comprised by 1280×720 pixel frames at 90 frames per second with the following specifications: Horizontal resolution: 1280 pixels; Vertical resolution: 720 pixels; Horizontal frequency: 68.341 KHz; Vertical frequency: 89.378 Hz.

Because the video signal resolution matches the LCD panel resolution, we can directly match the timing signals of the video signal to the image segment sections we define on the LCD panel.

Figure 23:
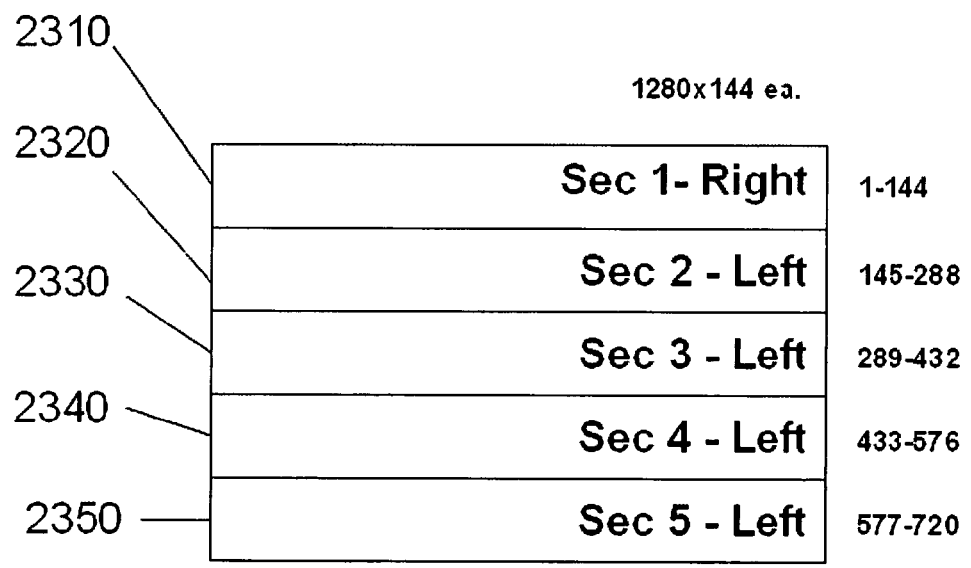
FIG. 23 illustrates display section sizes in an embodiment of the present invention.

In FIG. 23, Section 1 2310 would be comprised in the LCD panel rows of 1280 pixels from row 1 to row 144, Section 2 2320 from 145 to 288, section 3 2330 from 289 to 432, section 4 2340 from row 433 to 576 and section 5 2350 from row 577 to 720.

This means that the impulse backlight sections and the LC modulator sections match the image pixel rows we have defined in width and height before.

Also, the video signal defines the time it takes for a full frame to be displayed in order to achieve 90 frames per second. In the case of our video signal of 1280×720 the time 10.535 milliseconds for each frame.

Meaning that we have each period of time T described in the time sequence is 2.0706 milliseconds.

Figure 24:
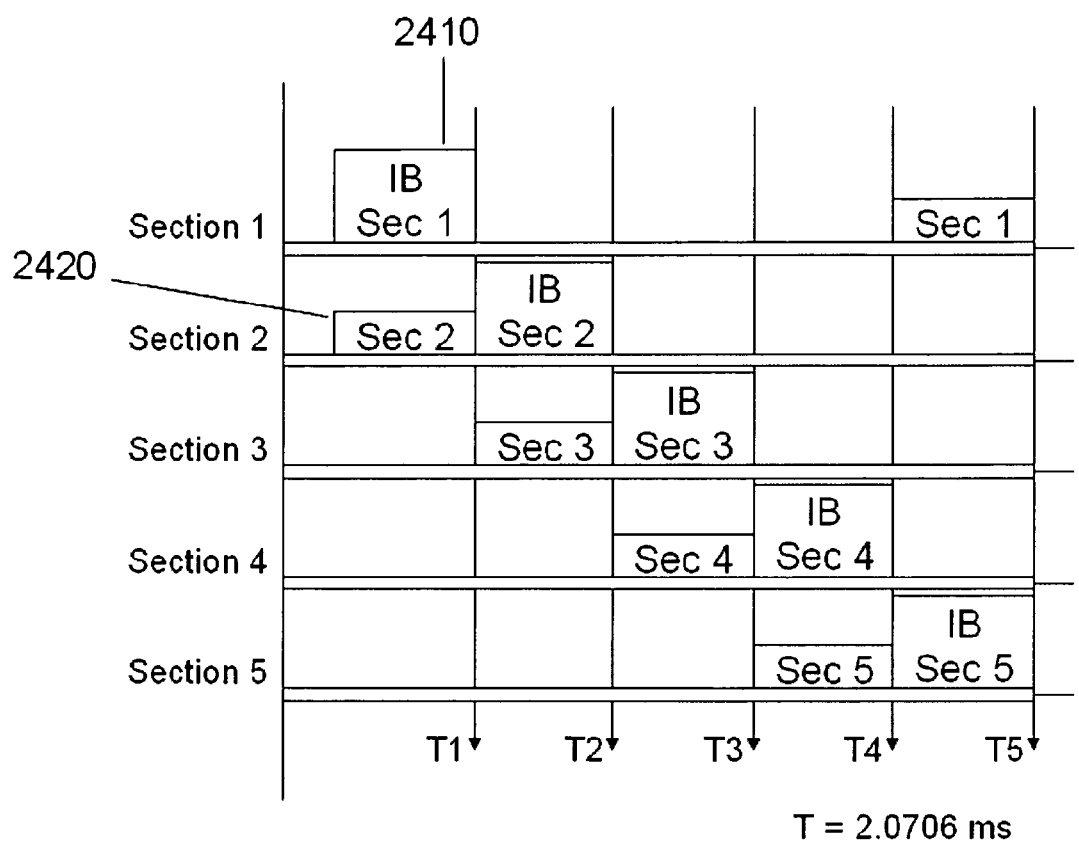
FIG. 24 illustrates a display timeline in an embodiment of the present invention.

So as depicted in FIG. 24, in T=1 section 1 image pixels are in a updated image state and the impulse backlight labeled "IB" is turned ON 2410, at the same time section 2 is being updated 2420. This gives just enough time for section 2 pixels to update within their 2 millisecond GTG time response. To insure that this happens we address each image section at once in order to give enough time for all pixels in the image section to update adequately, meaning that we address the 1280×144 pixels or 184,320 pixels each image section. In other words the LCD panel has an image-section-sequential update.

Response time of the impulse backlight and the LC modulator is within the 100 to 200 microsecond range meaning that they have a good enough response for the end user no to notice it as a factor of performance of the display.

The present invention implements a stereo 3D ready LCD monitor from the combination of an impulse backlight, an LCD panel and an LC modulator. Its present embodiment allows for time sequential display of stereo 3D video signals with the use of analyzing glasses by the end user.

The present invention has been described above in connection with several preferred embodiments. This has been done for purposes of illustration only, and variations of the inventions will be readily apparent to those skilled in the art and also fall within the scope of the invention.

The invention claimed is:

1. An electronic stereoscopic three-dimensional display device that is configured to display images sequentially as a plurality of discrete image sections which are to be observed by a user with polarizing eyewear, comprising:
an impulse backlight configured to independently illuminating each of said plurality of image sections, wherein a given image section is a segmented subset of a corresponding image;
a liquid crystal display (LCD) panel configured to independently loading and holding image data for each of said plurality of image sections;
a liquid crystal (LC) modulator configured to independently polarizing image data for each of said plurality of image sections with a plurality of polarizations, a first of said plurality of polarizations corresponding to a left eye image and a second of said plurality of polarizations corresponding to a right eye image; and
a controller configured to control said impulse backlight, said LCD panel and said LC modulator;
wherein, during a first time period, for a first of said image sections, said impulse backlight is enabled, said LCD panel is controlled to hold data corresponding to said left eye image, and said LC modulator is controlled to polarize according to said first of said polarizations;
wherein, during said first time period, for a second of said image sections, said impulse backlight is disabled, and said LCD panel is controlled to load data corresponding to said left eye image;
wherein, during a second time period, for said first of said image sections, said impulse backlight is disabled;
wherein, during said second time period, for said second of said image sections, said impulse backlight is enabled, said LCD panel is controlled to hold data corresponding to said left eye image and said LC modulator is controlled to polarize according to said first of said polarizations; and
wherein, by sequentially displaying said plurality of discrete image sections, said electronic stereoscopic three-dimensional display device presents said images to said user at a frame rate exceeding a flicker fusion rate of a human eye.

2. The electronic stereoscopic three-dimensional display device of claim 1, wherein, during a third time period, for said first of said image sections, said impulse backlight is disabled and said LCD panel is controlled to load data corresponding to said right eye image; and wherein, during said third time period, for said second of said image sections, said impulse backlight is disabled.

3. The electronic stereoscopic three-dimensional display device of claim 2, wherein, during a fourth time period, for said first of said image sections, said impulse backlight is enabled, said LCD panel is controlled to hold data corresponding to said right eye image, and said LCD modulator is controlled to polarize according to said second of said polarizations; and wherein, during said fourth time period, for said second of said image sections, said impulse backlight is disabled.

4. The electronic stereoscopic three-dimensional display device of claim 1, wherein said LC modulator is controlled with a plurality of voltage levels for each of said plurality of polarizations.

5. The electronic stereoscopic three-dimensional display device of claim 1, wherein said impulse backlight is controlled to illuminate only one of said plurality of image sections at a time.

6. The electronic stereoscopic three-dimensional display device of claim 1, wherein, during said first time period, for said second image section, said LC modulator is controlled to polarize according to said first of said polarizations.

7. The electronic stereoscopic three-dimensional display device of claim 1, wherein, during said first time period, for said second image section, said LC modulator is controlled to polarize according to said second of said polarizations.

8. The electronic stereoscopic three-dimensional display device of claim 1, wherein, during said second time period, for said first image section, said LCD panel is controlled to hold data corresponding to said left eye image, and said LC modulator is controlled to polarize according to said first of said polarizations.

9. The electronic stereoscopic three-dimensional display device of claim 1, wherein said device comprises five image sections arranged as five distinct groups of horizontal lines;
wherein said controller is configured to control said impulse backlight, said LCD panel and said LC modulator at a frame rate of greater than approximately 90 frames per second; and
wherein each of said image sections is illuminated and displays image data corresponding to said left eye image for approximately one tenth of a frame period corresponding to said frame rate and is illuminated and displays data corresponding to said right eye image for approximately one tenth of said frame period.

10. A method for displaying stereoscopic three-dimensional data using a sequential display of a plurality of discrete image sections and observed by a user with polarizing eyewear, the method comprising:
during a first time period, for a first of said image sections, enabling an impulse backlight, controlling an LCD panel to hold data corresponding to said left eye image, and controlling an LC modulator to polarize according to a first polarization corresponding to said left eye image;
during said first time period, for a second of said image sections, disabling said impulse backlight, and controlling said LCD panel to load data corresponding to said left eye image;
during a second time period, for said first of said image sections, disabling said impulse backlight; and
during said second time period, for said second of said image sections, enabling said impulse backlight, controlling said LCD panel to hold data corresponding to said left eye image and controlling said LC modulator to polarize according to said first polarization, wherein a given image section is a segmented subset of a corresponding image; and wherein, by sequentially displaying said plurality of discrete image sections, said method presents images associated with said stereoscopic three-dimensional data to said user at a frame rate exceeding a flicker fusion rate of a human eye.

11. The method of displaying stereoscopic three-dimensional data of claim 10, wherein the method further comprises:

during a third time period, for said first of said image sections, disabling said impulse backlight and controlling said LCD panel to load data corresponding to said right eye image; and during said third time period, for said second of said image sections, disabling said impulse backlight.

12. The method of displaying stereoscopic three-dimensional data of claim 11, wherein the method further comprises:

during a fourth time period, for said first of said image sections, enabling said impulse backlight, controlling said LCD panel to hold data corresponding to said right eye image, and controlling said LCD modulator to polarize according to a second polarization corresponding to said right eye image; and during said fourth time period, for said second of said image sections, disabling said impulse backlight.

13. The method of displaying stereoscopic three-dimensional data of claim 10, wherein said LC modulator is controlled with a plurality of voltage levels for each of said plurality of polarizations.

14. The method of displaying stereoscopic three-dimensional data of claim 10, wherein said impulse backlight is controlled to illuminate only one of said plurality of image sections at a time.

15. The method of displaying stereoscopic three-dimensional data of claim 10, wherein, during said first time period, for said second image section, said LC modulator is controlled to polarize according to said first of said polarizations.

16. The method of displaying stereoscopic three-dimensional data of claim 10, wherein, during said first time period, for said second image section, said LC modulator is controlled to polarize according to said second of said polarizations.

17. The method of displaying stereoscopic three-dimensional data of claim 10, wherein, during said second time period, for said first image section, said LCD panel is controlled to hold data corresponding to said left eye image, and said LC modulator is controlled to polarize according to said first of said polarizations.

18. The method of displaying stereoscopic three-dimensional data of claim 10, wherein said device comprises five image sections arranged as five distinct groups of horizontal lines;

wherein said impulse backlight, said LCD panel and said LC modulator are controlled to operate at a frame rate of greater than approximately 90 frames per second; and wherein each of said image sections is illuminated and displays image data corresponding to said left eye image for approximately one tenth of a frame period corresponding to said frame rate and is illuminated and displays data corresponding to said right eye image for approximately one tenth of said frame period.

* * * * *